(12) United States Patent
Asahina

(10) Patent No.: US 6,847,621 B1
(45) Date of Patent: Jan. 25, 2005

(54) ADDRESS RESOLUTION METHOD AND ADDRESS RESOLUTION COMMUNICATION SYSTEM

(75) Inventor: Hiroshi Asahina, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/576,294

(22) Filed: May 23, 2000

(30) Foreign Application Priority Data

May 25, 1999 (JP) .......................................... 11/145314

(51) Int. Cl.⁷ ............................ H04Q 7/00; H04Q 7/24
(52) U.S. Cl. .................................. 370/331; 370/338
(58) Field of Search ................................ 370/331, 338, 370/342, 398, 401; 455/426, 432, 445

(56) References Cited

U.S. PATENT DOCUMENTS

| 5,896,369 A | * 4/1999 | Warsta et al. ................ 370/338 |
| 5,974,452 A | * 10/1999 | Karapetkov et al. ........ 709/218 |
| 6,172,982 B1 | 1/2001 | Ishii et al. |
| 6,587,684 B1 | * 7/2003 | Hsu et al. ................... 455/419 |

FOREIGN PATENT DOCUMENTS

| JP | 6-197131 | 7/1994 |
| JP | 9-130391 | 5/1997 |
| JP | 9-139742 | 5/1997 |
| JP | 9-275418 | 10/1997 |
| JP | 10-70562 | 3/1998 |
| JP | 10-242994 | 9/1998 |
| JP | 10-243023 | 9/1998 |
| JP | 2-845207 | 10/1998 |
| JP | 10-303904 | 11/1998 |
| JP | 10-303965 | 11/1998 |
| JP | 11-032087 | 2/1999 |
| WO | WO 00/48363 | 8/2000 |

OTHER PUBLICATIONS

Network Working Group, Request for Comments: 2002, 42 pgs., Oct. 1996.

(Internet Engineering Task Force Document) Network Working Group, Request for Comments: 826, 7 pgs., Nov. 1982.

* cited by examiner

Primary Examiner—Chau Nguyen
Assistant Examiner—Andrew Wahba
(74) Attorney, Agent, or Firm—Foley & Lardner LLP

(57) ABSTRACT

In an address resolution method for an inter-working function (IWF) for mutually connecting mobile packet terminals (MS) and a radio system accommodating the packet terminals (MS) and a packet network having a switch node, when the packet terminal (MS) is handed over, the packet terminal (MS) transmits a kind of "address resolution protocol (ARP): see Internet Engineering Task Force Document RFC826", the inter-working function (IWF) transmits the ARP packet to the packet network and the switch node renews an address management table on the basis of the packet received.

15 Claims, 8 Drawing Sheets

ADDRESS RESOLUTION METHOD AND ADDRESS RESOLUTION COMMUNICATION SYSTEM

BACKGROUND OF THE INVENTION

1. Field of the Invention

The present invention relates to an address resolution method and an address resolution communication system for a mobile packet terminal in a mobile communication system serving as a connection oriented type network, and more particularly to an address resolution method and an address resolution communication system for a mobile terminal which is changed at any time by handover of the mobile terminal when the mobile packet terminal and a connectionless type network are connected to each other.

2. Description of the Related Art

An address resolution protocol ARP is a protocol for dynamically associating an IP address and a physical address (MAC address in the case of Ethernet) in the Internet protocol IP. For example, when the physical address (00-22 bit-24 bit) of a target host is not known although the IP address (123, 45, 67, 8) thereof is known, an IP packet containing a destination IP address as "address resolution request" is transmitted to all the terminals in order to known the physical address of the target host. When a terminal receiving the IP packet checks the IP address and knows that it is a request addressed to the terminal itself, the terminal returns its own physical address as "address resolution reply". Here, when the "address resolution request" is transmitted via a switch node (SW), an address management table of the switch node (SW) stores an IP address and a physical address passed through each input/output port to store the terminal connected to the tip of each input/output port.

The "address resolution reply" returned from the destination terminal arrives at the transmission origin terminal to allow the transmission source terminal to refer to the physical address of the destination terminal. Therefore, the transmission source terminal can create a frame in which the physical address of the communication partner host is set, and transmit the IP packet to the connectionless type network.

Here, an "address resolution request" packet in which the destination IP address and the transmission source address are set to the same address is referred to as "Gratuitous-ARP" of the present invention as described later. A terminal transmitting this ARP packet does not expect any reply. A terminal which receives the Gratuitous-ARP packet discards it if the IP address thereof is not the IP address of the terminal itself. On the other hand, if the IP address is the IP address of the terminal itself, the terminal returns a reply. Therefore, both the transmission terminal/reception terminal can detect the duplication of the IP address.

The above operation is associated with the address resolution system. However, for the communication system based on the mobile packet terminal in which the terminal moves, a mechanism of performing address resolution has been proposed as the 2002$^{nd}$ of the RFC (Request For Comment) document (see RFC2002). The detailed description on the Mechanism of Mobile IP is omitted because it is based on the "RFC2002" document.

As described above, when the packet terminal is fixed, in the network containing the switch node, the association between the respective input/output ports of the terminal and the switch node is not changed. However, when a terminal having a radio line is used as a physical layer protocol, there occurs so-called "handover" in which the mobile packet terminal moves to a different place. In this case, a node and an inter-working device (IWF) which terminate the radio line are physically changed.

As the radio line has been known an IS-95 system which is standardized in EIA (Electronic Industries Association), TIA (Telecommunication Industry Association), ANSI (American National Standard Institute) and CDG (CDMA Development Group) serving as institutes of standards of U.S.A. The IS-95 system is supplied as a public mobile communication system using techniques such as double code arrangement and soft handover, and a spread spectrum technique. The inter-working device (IWF: Inter-Working Function) is defined as a device having an interfacial function as a mutual connection unit for performing mutual connections between the connection oriented type communication system and the connectionless type communication system.

FIG. 1 shows the operation of the handover in a network having a switch node. As shown in FIG. 1, the radio-communication system comprises a mobile packet terminal (MS1:Mobile Station 1A), base station radio devices (BTS2: Base transceiver stations 1A, 2B), base station controllers (BSC3: Base Station Controllers 3A, 3B), a mobile communication switching station (MSC4: Mobile Switching Center 4), a switch node 6, a packet network 7 connected to the outside and an inter-working device (IWF) 5 for connecting a radio interface an a packet network.

FIGS. 7 and 8 show data transmission on the basis of a conventional address table.

A mobile station MS1A is connected to a base transceiver station (BTS2A) (not shown) through a radio line, and also connected through a base station controller (BSC3A) to an inter-working function locating in the range and a port 61 of the switch node 6. The switch node 6 has plural ports for the mobile stations such as a port 62 for the base station controller (BSC3B) (not shown), etc., a port 63 to be connected to the packet network serving as the connectionless type network, a switch port 65 as a transfer change-over switch and an address management table 64.

The address management table 64 has a corresponding table which associates the physical address of a mobile station (MS) 1A (for example, a mobile device ID) with a port (for example, port 61) on the basis of an "address resolution request" transmitted from the mobile station (MS) 1A.

When the mobile station MS1A transmits an IP packet containing a destination address and a transmission source address, the IP packet is transmitted through BTS2A, BSC3A, the inter-working function (IWF) 5A and the port 61 to a switch portion 65.

The switch portion 65 refers to the address management table 64 on the basis of the destination address of the IP packet to determine the physical address of the packet network 7, and outputs the IP packet to a port 63 directing to the packet network 7. Conversely, when a call is made to the mobile station MS1A, the port 61 at which the physical address of the mobile station MS1A is registered is likewise determined on the basis of the address management table, and the IP packet is transmitted to the mobile station MS1A serving as a destination.

As described above, when an inter-working function (IWF) for connecting a radio line serving as a connection oriented type network and a connectionless type network is changed like the inter-working function (IWF) of the range in which the mobile station MS1A locates is handed over to a different inter-working function (IWF) 5B, the input/output ports of the switch node provided to the connectionless type network are changed. In this case, the port 61 registered in the address management table 64 is inconsistent with the physical address of the actual MS1A, and thus there occurs unconformity between the IP packet transmitted to each input/output port and the physical address management table provided to the switch node.

Therefore, it is impossible that the IP packet addressed to MS1A is transmitted to the inter-working device IWF5A.

As described above, when the mobile station MS1A is handed over, it is necessary to promote the switch node to change the association of the logical-physical addresses. However, in the prior art, the functions must be installed in cooperation between the packet network and the mobile station by using the Mobile IP serving as the mobile management protocol, and thus compatibility and processing capability of nodes are required.

SUMMARY OF THE INVENTION

Therefore, an object of the present invention is to provide an address resolution method when a mobile packet terminal (mobile station: MS) in a connection oriented type network is handed over, together with an address resolution addressed from a connectionless type network to a mobile packet terminal (mobile station: MS).

In order to attain the above object, there is provided an address resolution method with which in an inter-working function (IWF) for connecting moving mobile packet terminals (MS) and a radio system containing these mobile packet terminals and a packet network having switch nodes, a destination address of an IP packet addressed from a switch node to a mobile packet terminal MS is set to be directed to a MS-locating inter-working function (IWF) at all times with neither an access to a terminal position registered data base (HLR: Home Location Register) nor a special-purpose mobile management protocol by transmitting a "Gratuitous-ARP" which is a kind of ARP request packet, thereby renewing the address table of the switch node.

Therefore, according to the present invention, there is provided a communication system comprising plural mobile packet terminals (mobile stations: MS), a connection oriented type network which accommodates the mobile packet terminals (MS) and supplies a connection oriented type communication, a connectionless type network having a switch node (SW) and an inter-working function (IWF) for mutually connecting the respective networks, characterized in that when a mobile packet terminal (MS) is handed over, the inter-working function (IWF) receives from the mobile packet terminal (MS) data containing a Gratuitous-ARP packet which is one type of address resolution protocol (ARP) (see IETF: Internet Engineering Task Force Document RFC826), transmits the packet to the connectionless type network to make the switch node (SW) receive it, and the switch node (SW) renews a physical address management table provided in the switch node (SW) on the basis of the content of the packet to specify the inter-working function (IWF) at the handover destination of the mobile packet terminal (MS).

Further, according to the present invention, there is provided an address resolution communication system comprising plural moving mobile packet terminals (MS), a connection oriented type network which accommodates the plural mobile packet terminals (MS) and supplies a connection oriented type communication, a connectionless type network having a switch node (SW) and an inter-working function (IWF) for mutually connecting the respective networks to each other, characterized by comprising: the inter-working function (IWF) for receiving data containing a "Gratuitous-ARP" packet which is one type of "address resolution protocol" (ARP) (see IETF: Internet Engineering Task Force Document RFC826) from the mobile packet terminal (MS) when the mobile packet terminal (MS) is handed over, and transmitting the "Gratuitous-ARP" packet to the connectionless type network to make the switch node (SW) receive the "Gratuitous-ARP"; and the switch node (SW) for renewing a physical address table provided in the switch node (SW) on the basis of the content of the "Gratuitous-ARP" packet to specify the inter-working function (IWF) at the handover destination of the mobile packet terminal (MS).

DETAILED DESCRIPTION OF THE PREFERRED EMBODIMENTS

Preferred embodiments according to the present invention will be described hereunder with reference to the accompanying drawings.

[First Embodiment]

(Description of Construction)

Figure 1:
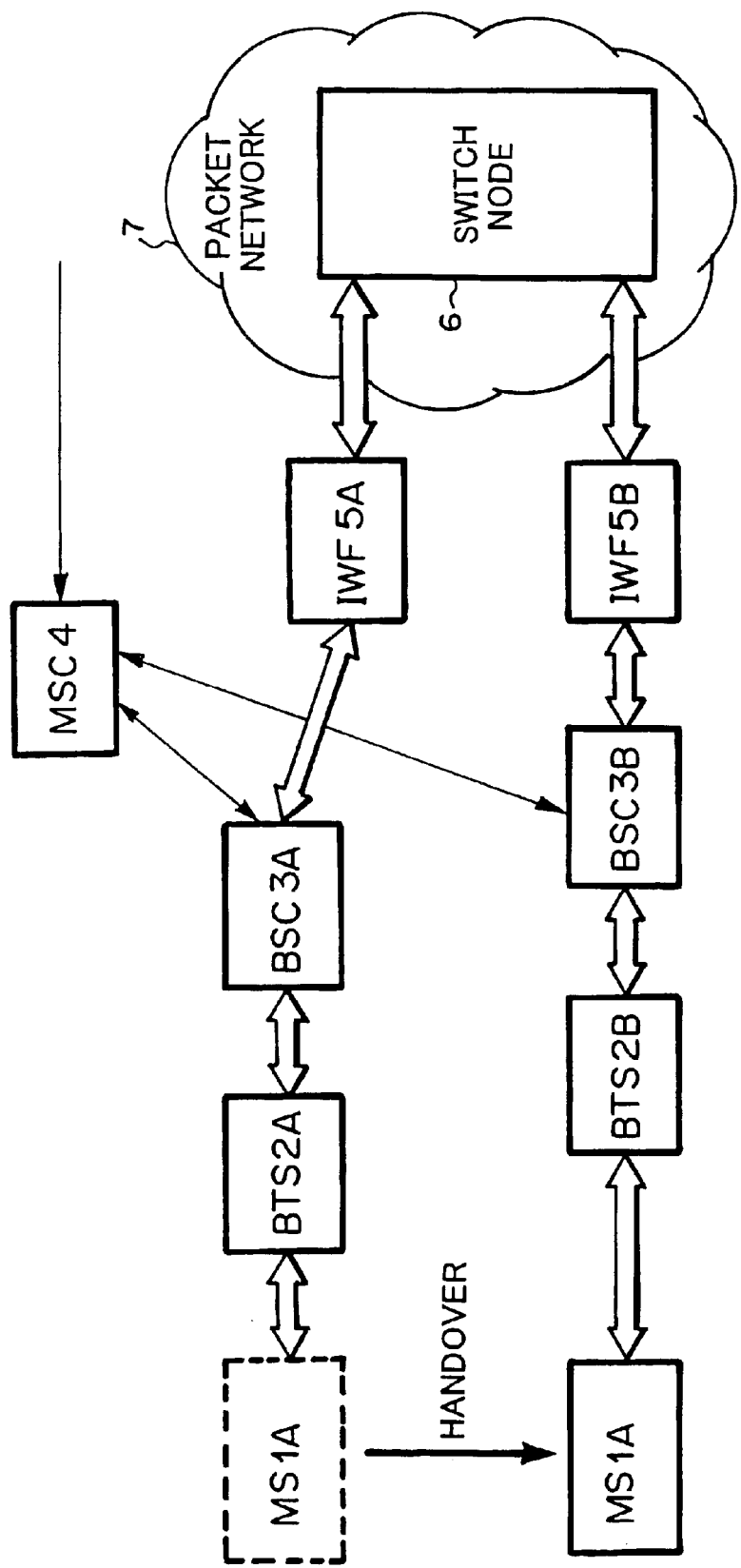
FIG. 1 is a diagram showing a system to which an address resolution method of the present invention is applied.

FIG. 1 shows the construction of a communication system to which the present invention is applied.

This communication system comprises a mobile packet terminal (mobile station: MS1), a base transceiver station (BTS2), a base station controller (BSC3), a mobile station center (MSC4), a switch node 6, a packet network 7 connected to the outside, and an inter-working function (IWF) 5 for connecting a radio interface and the packet network to each other. An international standard IS-95 interface is used as the radio interface of each unit. Ethernet is provided as a link layer of the switch node. The other communication system diagrams are the same as described with respect to the prior art.

Figure 2:
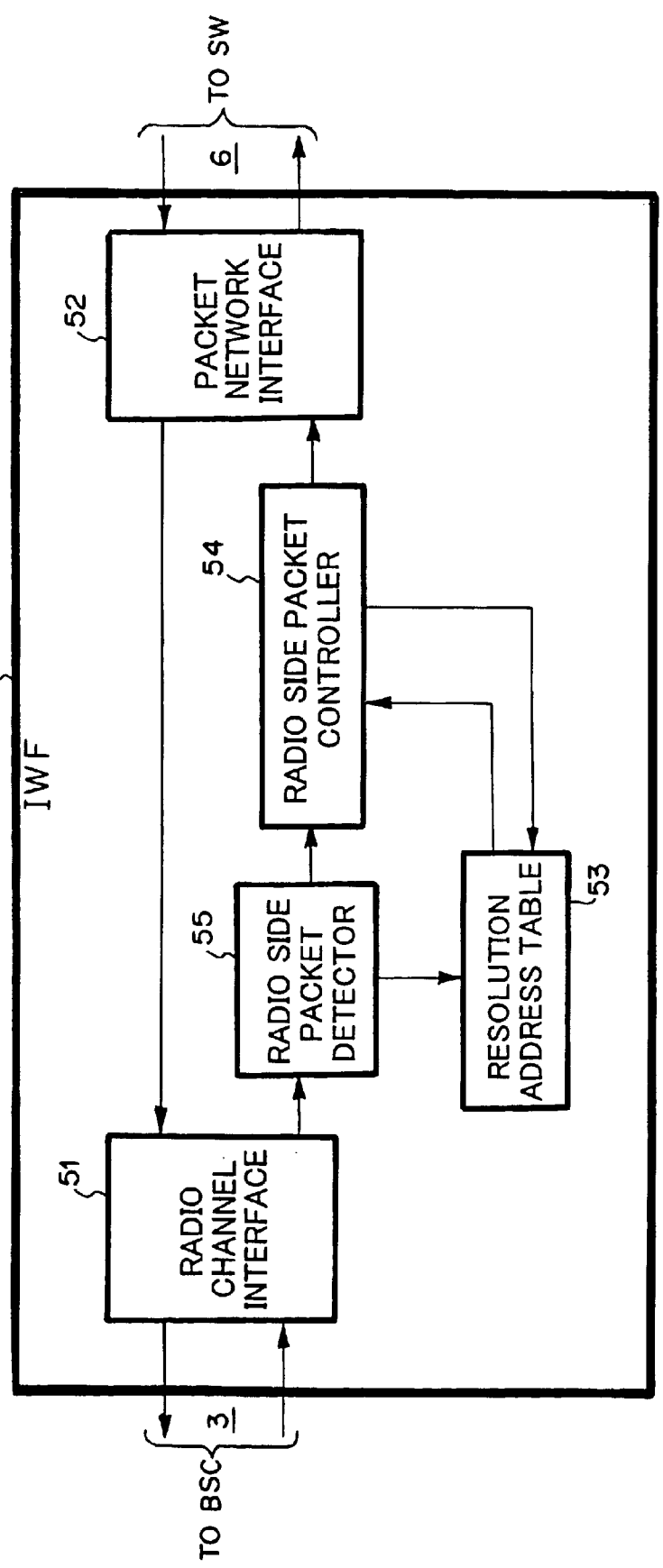
FIG. 2 is a schematic diagram showing an inter-working function (IWF) of the address resolution method of the present invention.

FIG. 2 shows the construction of the inter-working function IWF 5. The inter-working function IWF 5 comprises a radio channel interface 51 connected to the base station controller BSC 3, a packet network interface 52, a resolution address table 53, a radio side packet controller 54 and a radio side packet detector 55.

Figure 3:
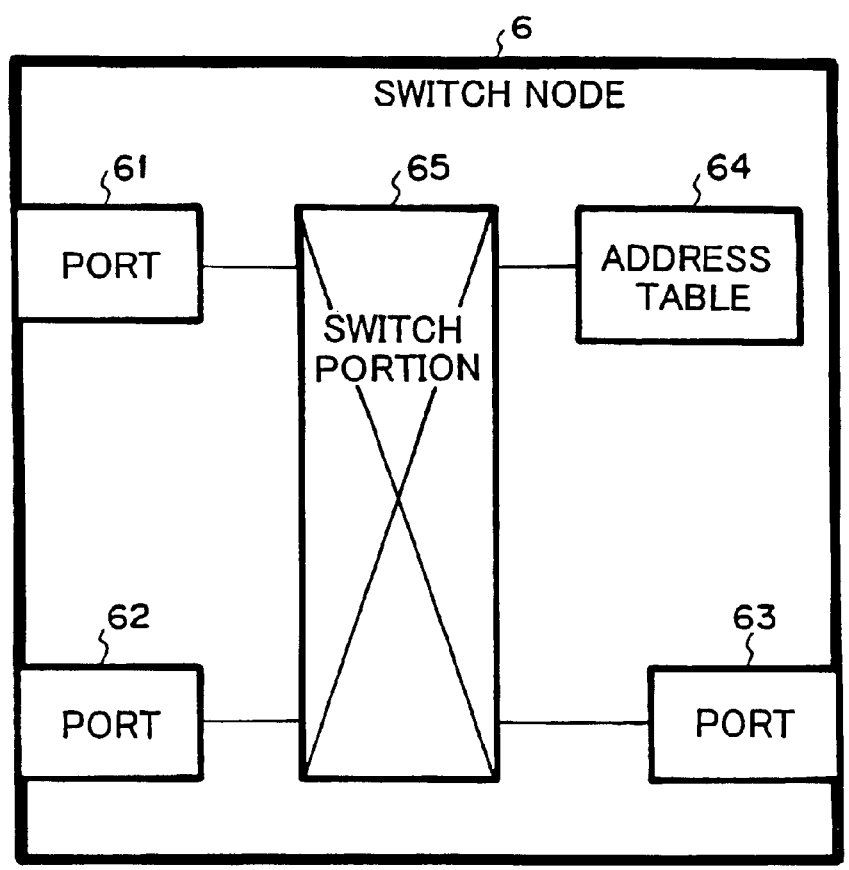
FIG. 3 is a schematic diagram showing a switch node of the address resolution method of the present invention.

FIG. 3 shows the construction of the switch node 6. The switch node 6 comprises the base transceiver station (BTS2A), the base station controller (BSC3A), the port 61 for the inter-working function IWF5A, the base transceiver station (BTS2B), the base station controller (BSC3B), the port 62 for the inter-working function IWF5B, the port 63 for the packet network 7, the address management table 64 and the switching portion 65 having a switching function.

(Description of Operation)

When the packet terminal MS1A of a mobile is connected to the switch node 6 in the packet network 7 through the inter-working function IWF5A, the packet terminal MS1A is handed over under the base station control BSC3B.

Figure 5:
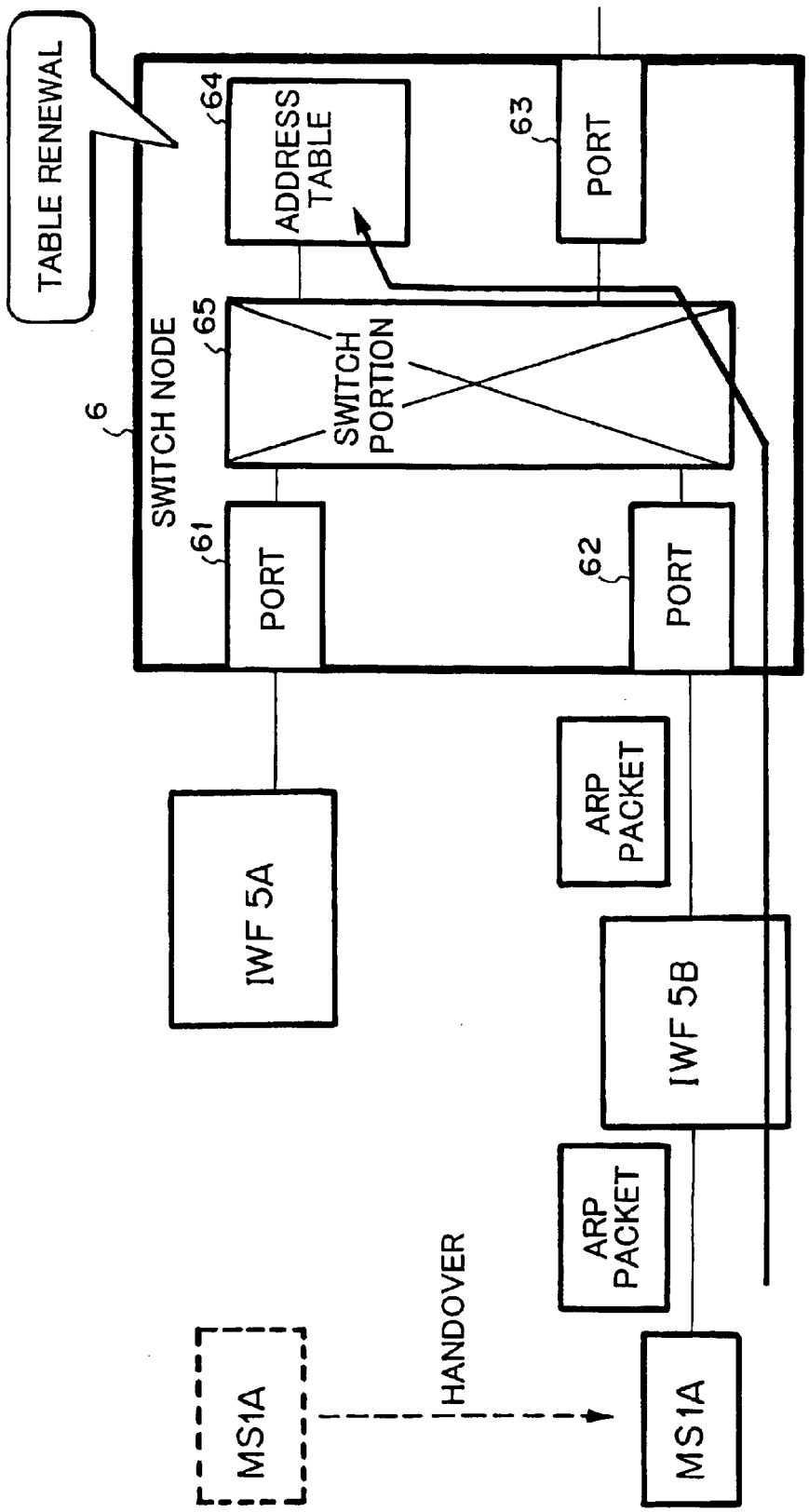
FIG. 5 is a route setting diagram based on an address table of the address resolution method according to the present invention.

Subsequently, as shown in the flow of the data indicated by a heavy line of FIG. 5, the packet terminal MS1A transmits a "Gratuitous-ARP" of the address resolution protocol to the inter-working function IWF5B through the base transceiver station (BTS2B) and the base station controller (BSC3B), and notifies its own "mobile ID" and "IP address" to the inter-working function IWF5B.

Figure 4:
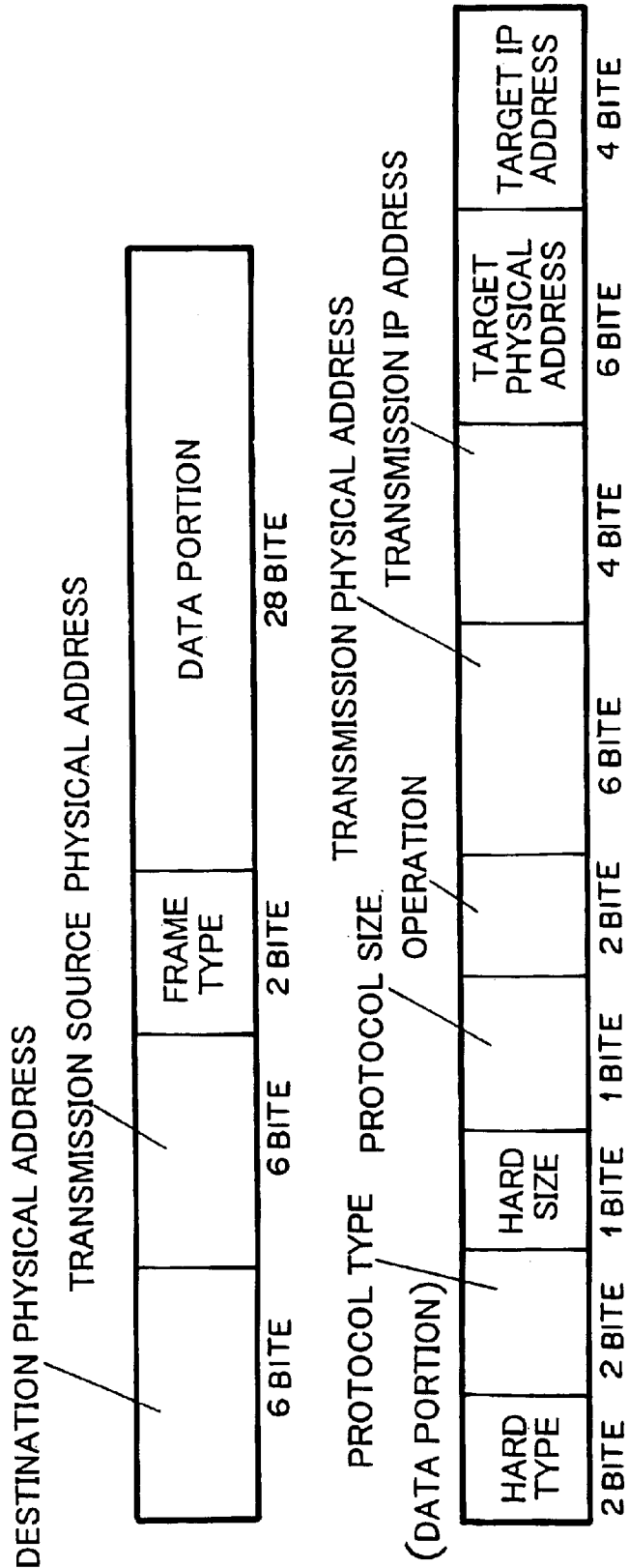
FIG. 4 is a diagram showing the structure of an address resolution protocol (ARP) packet of the address resolution method.

The construction of the "Gratuitous-ARP" message is shown in FIG. 4. The message comprises a destination physical address 6, a transmission source physical address 6, a frame type 2 and a data portion 28. the number allocated to each of the above elements indicates the number of byte units, and for example, the frame type indicates 2 bytes. The data portion comprises a hardware type 2 for identifying a network, a request source protocol type 2 which is located at the upper layer of a network access layer such as IP or the like and identifies the protocol, a hard size 1 having a hardware address length for indicating the length of MAC (Media Access Control) address, a protocol size 1 having a protocol address length for indicating the length of an IP address, an operation 2 for identifying whether the message is an ARP request message or ARP reply message, a transmission physical address 6 for indicating a transmission source hardware address of a packet, a transmission IP address 4 of the transmission source of a packet, a physical address 6 which is unused in this message, and a transmission IP address 4 of the transmission source of the packet, totally 28 bytes.

When receiving a link layer frame in the radio channel interface 51, the inter-working function IWF5B extracts the IP packet in the radio side packet detector 55, and judges whether the "frame type" shown in FIG. 4 is "0806" and the "operation" field is equal to 1. If the judgment is YES, the packet concerned is judged as the "Gratuitous-ARP" message, and stored in the resolution address table 53.

Subsequently, when the "Gratuitous-ARP" message is stored in the resolution address table 53, the radio side packet controller 56 of the inter-working function IWF5B sets the "transmission source physical address" an the "target physical address" in the ARP message shown in FIG. 4 to the physical address of the inter-working function IWF5B, and sets the "transmission IP address" and the "target IP address" to the IP address of the packet terminal MS1A. At the same time, it stores the IP address and the physical address of MS1A.

The message thus set is converted to an Ethernet frame in which the destination is set to the switch node an the transmission source is set to the inter-working function (IWF)5B, and then it is transmitted as "Gratuitous-ARP" to the packet network interface 52.

Figure 6:
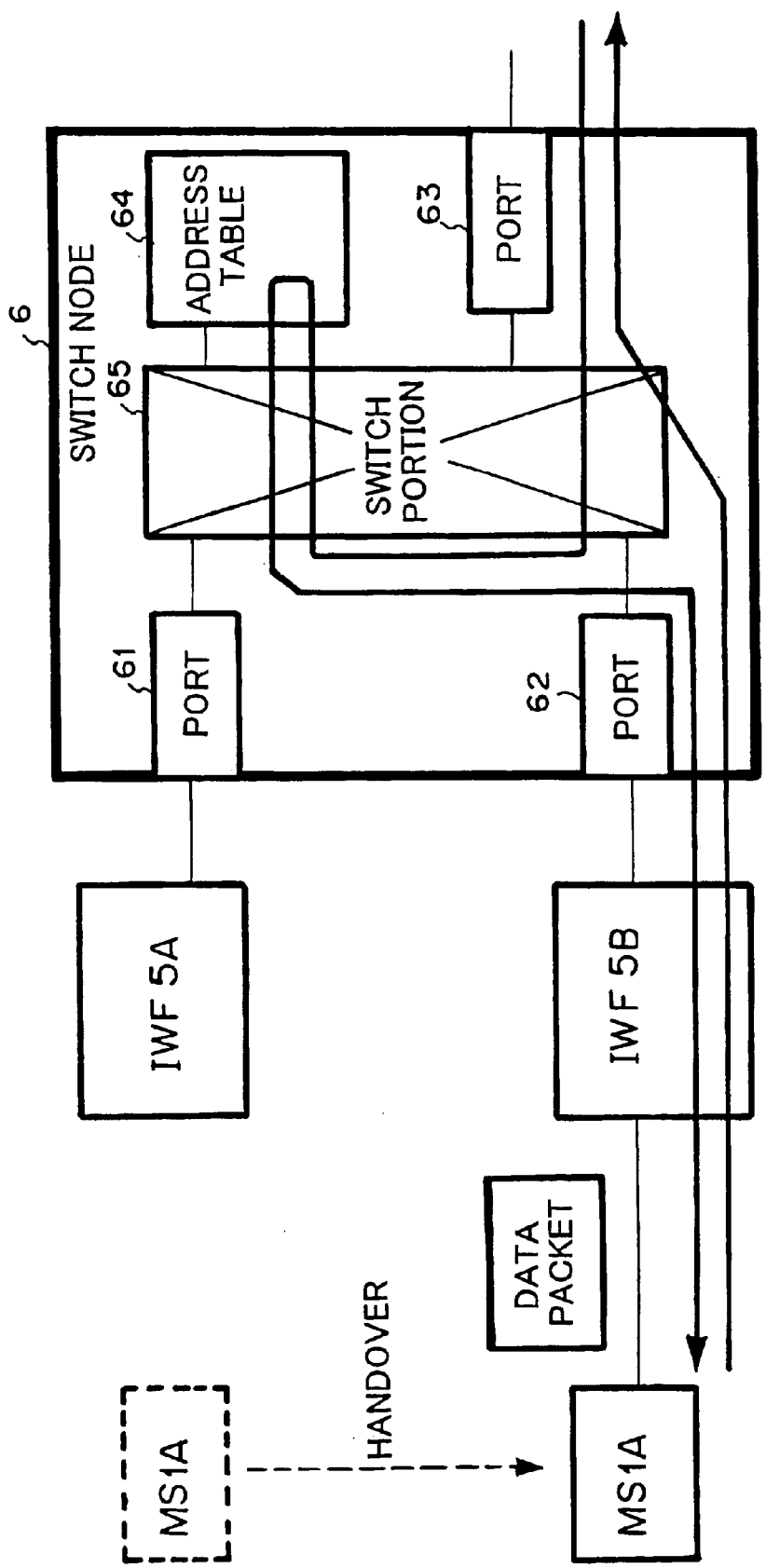
FIG. 6 is a route setting diagram based on the address table of the address resolution method according to the present invention.
Figure 7:
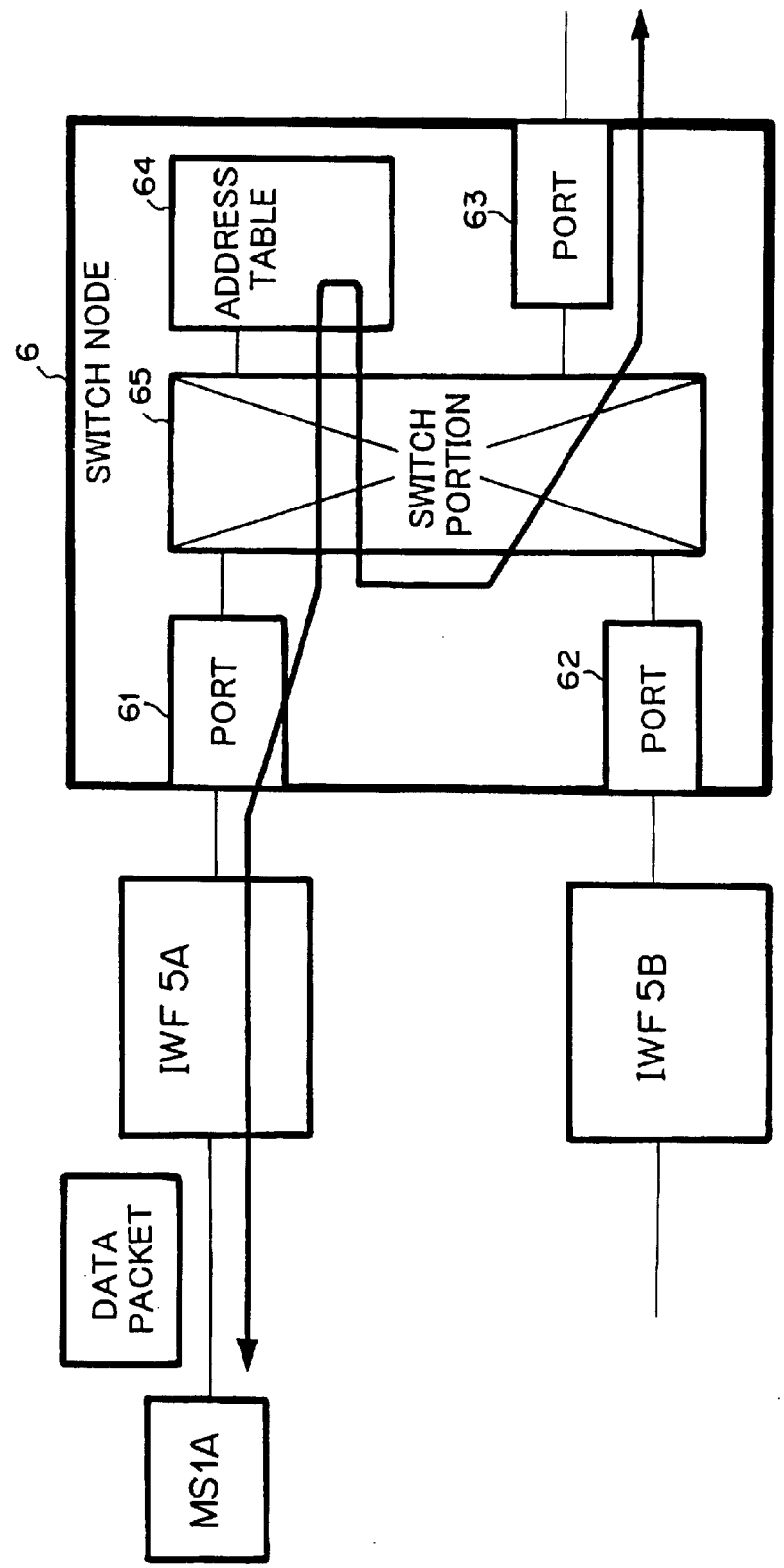
FIG. 7 is a route setting diagram based on the address table of the address resolution method according to the present invention.
Figure 8:
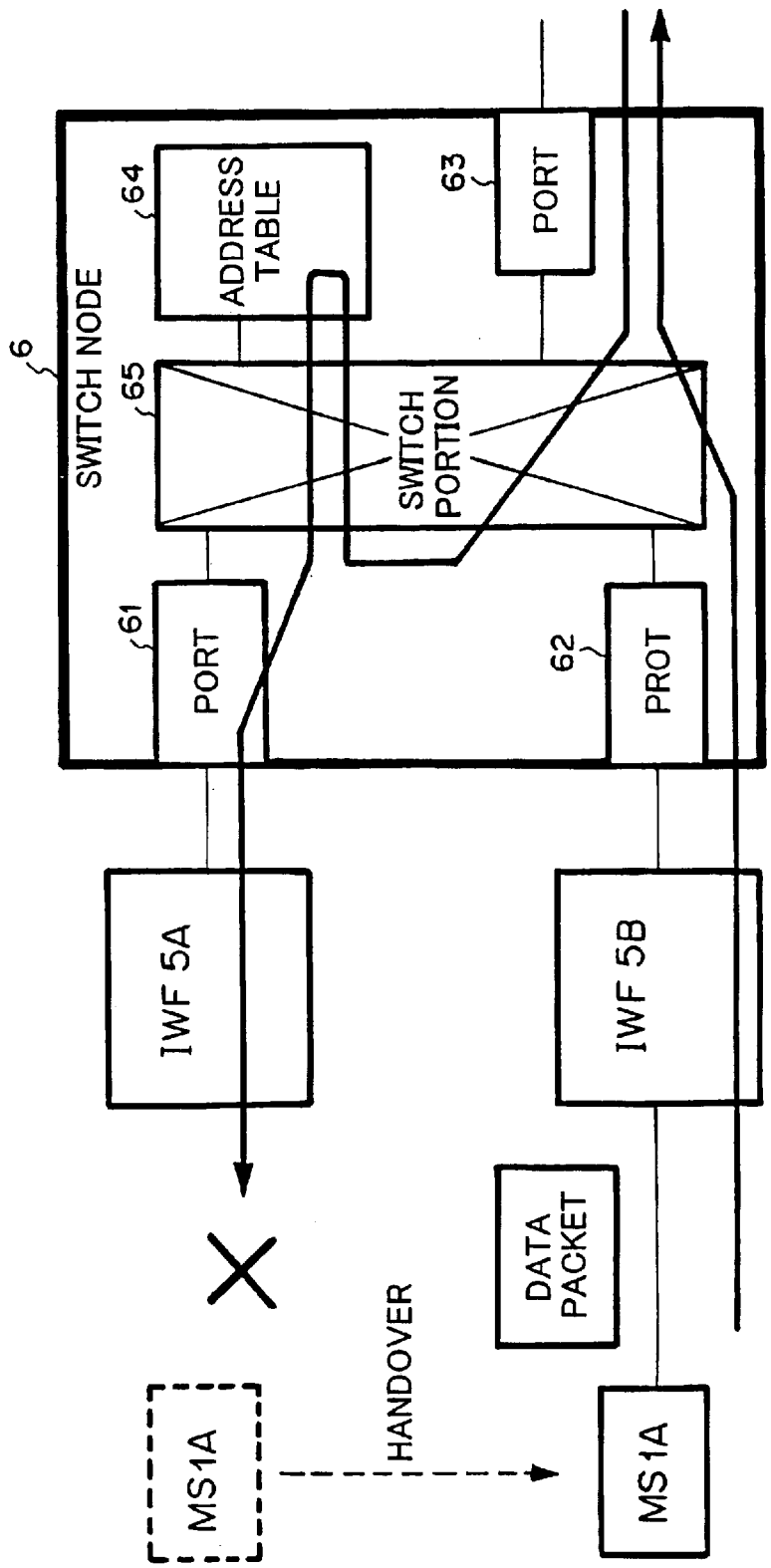
FIG. 8 is a route setting diagram based on a conventional address resolution method.

As shown in the flow of data indicated by a heavy line of FIG. 6, when receiving the frame as "Gratuitous-ARP", the switch node 6 registers the physical address of the inter-working function IWF5B as the physical address of the entry of the packet terminal MS1A of the address management table 64, renews the address management table 64 and associates it with the port 62. Subsequently, the switch node 6 direct to the port 62 a packet address to the packet terminal MS1A. With respect to the connection of the port 63, the state is the same as before the handover and thus the port 62 and the port 63 are connected to each other, and thus the data communication is continued.

The destination of the "Gratuitous-ARP" packet transmitted from the inter-working function IWF5B is set to the switch node, so that the packet does not reach another inter-working function IWF5A.

In the above embodiment, the packet data communication between the packet terminal MS of the mobile and the fixed packet network terminal is described. However, the present invention is applicable to the packet transmission between packet terminals MS of mobiles, and the mutual communication between mobiles can be performed by referring to the address management table in the switch node.

[Second Embodiment]

The construction and operation of the second embodiment are different from those of the first embodiment in that the physical address in the ARP packet from the mobile packet terminal MS is the "telephone number" given to MS. The description with respect to FIG. 1 and FIGS. 2 to 6 is the same as the first embodiment.

In this case, "the packet terminal MS1A first sets the telephone number given to MS" as an ARP request packet (Gratuitous-ARP) shown in FIG. 4, as the transmission physical address after the handover is detected.

In the resolution address table of the inter-working function (IWF) are stored the "IP address" and the "telephone number" of MS1A.

The "Gratuitous-ARP" to the switch node is the same as the first embodiment.

A mobile packet terminal of the above embodiment is applied to a mobile terminal used for a CDMA system in the mobile terminal of the above IS-95 system, and the handover is identified from the mobile terminal, and the "Gratuitous-ARP" indicating ID of its own mobile terminal and destination IWF are transmitted to a base station, whereby it operates as a connection oriented type system as the radio side and the routing based on the connectionless type system at a wiring side based IMF as a mutual connecting device is established, thereby allowing the data radio transmission. Further, the present invention is not limited to the IS-95 system, and may be applied to even a mobile packet terminal used in the system of IMT-2000 (International Mobile Telecommunication-2000) which is called as a next-generation mobile communication.

According to the present invention, when the packet terminal (MS) of a mobile is handed over, the address resolution packet is transmitted from the packet terminal MS to renew the address management table of the switch node of the connectionless type network, so that no special mechanism for movement management is required and the physical address of an inter-working function (IWF) in which MS is located at all times is set at the resolution address addressed from the connectionless type network to the mobile packet terminal MS.

Therefore, the packet is prevented from being routed to the inter-working function (IWF) before the handover, and thus the communication loss can be avoided.

Further, it is sufficient to install the processing function of the address resolution packet in the packet terminal MS of the mobile and the inter-working function (IWF), so that an existing device can be used as the switch node.

Still further, a conventional protocol is used, and thus no special processing should be considered for the controllers of the switch node and the inter-working function (IWF).

Although the present invention has been shown and described with respect to best mode embodiments thereof, it should be understood by those skilled in the arty that the foregoing and various other changes, omissions, and additions in the form and detail thereof may be mode therein without departing from the spirit and scope of the present invention.

What is claimed is:

1. An address resolution method for a communication system comprising a plurality of mobile packet terminals, a connection oriented network which accommodates the mobile packet terminals and supplies a connection oriented communication, a connectionless network having a switch node and an inter-working device for mutually connecting the respective networks, comprising the steps of:

receiving data containing a Gratuitous-ARP packet which is of an address resolution protocol (ARP), from one of the mobile packet terminals by way of the inter-working device, in a case when the one mobile packet terminal is handed over to a handover destination on the connection oriented network;

transmitting the packet to the connectionless network by way of the inter-working device;

making the switch node receive the packet by way of the inter-working device;

renewing a physical address management table provided in the switch node on the basis of the content of the packet on the switch node; and determining another inter-working device at the handover destination of the one mobile packet terminal on the switch node.

2. The address resolution method as claimed in claim 1, wherein when the handover over the inter-working device is detected, the one mobile packet terminal creates and transmits the IP address of its own mobile packet terminal to a transmission IP address portion of a non-group ARP and a target IP address portion, and creates and transmits to a transmission physical address portion an ARP request message in which a mobile ID of its own mobile packet terminal is set.

3. The address resolution method as claimed in claim 1, wherein when the handover over the inter-working device is detected, the one mobile packet terminal creates and transmits the IP address of its own mobile packet terminal to a transmission IP address portion of a non-group ARP and a target IP address portion, and creates and transmits to a transmission physical address portion an ARP request message in which the telephone number of its own mobile packet terminal is set.

4. The address resolution method as claimed in claim 1, wherein the inter-working device uses Ethernet as the connectionless network, and when receiving data containing the ARP request message from the one mobile packet terminal, the inter-working device forms the data to an Ethernet frame as a physical layer of the connectionless network and transmits the Ethernet frame to the connectionless network.

5. The address resolution method as claimed in claim 1, wherein the inter-working device uses as the connection oriented communication system an IS-95 system which is standardized in EIA (Electronic Industries Association)/TIA (Telecommunication Industry Association), ANSI (American National Standard Institute) and CDG (CDMA Development Group).

6. The address resolution method as claimed in claim 2, wherein when the handover over the inter-working device is detected, the one mobile packet terminal creates and transmits the IP address of its own mobile packet terminal to a transmission IP (Internet Protocol) address portion of a non-group ARP and a target IP address portion, and creates and transmits to a transmission physical address portion an ARP request message in which a telephone number of its own mobile packet terminal is set.

7. The address resolution method as claimed in claim 2, wherein the inter-working device uses Ethernet as the connectionless network, and when receiving data containing the ARP request message from the one mobile packet terminal, the inter-working device forms the data to an Ethernet frame as a physical layer of the connectionless network and transmits the Ethernet frame to the connectionless network.

8. The address resolution method as claimed in claim 2, wherein the inter-working device uses as the connection oriented communication system an IS-95 system which is standardized in EIA (Electronic Industries Association)/TIA (Telecommunication Industry Association), ANSI (American National Standard Institute) and CDG (CDMA Development Group).

9. The address resolution method as claimed in claim 3, wherein the inter-working device uses as the connection oriented communication system an IS-95 system which is standardized in EIA (Electronic Industries Association)/TIA (Telecommunication Industry Association), ANSI (American National Standard Institute) and CDG (CDMA Development Group).

10. An address resolution communication system comprising a plurality of moving mobile packet terminals, a connection oriented network which accommodates the plural mobile packet terminals and supplies a connection oriented communication, a connectionless network having a switch node and an inter-working function for mutually connecting the respective networks to each other, the address resolution communication system comprising:

the inter-working function for receiving data containing a Gratuitous-ARP packet which is of an address resolution protocol (ARP) from one of the mobile packet terminals when the one mobile packet terminal is handed over, and transmitting the Gratuitous-ARP packet to the connectionless network to make the switch node receive the Gratuitous-ARP packet; and the switch node for renewing a physical address table provided in the switch node on the basis of the content of the Gratuitous ARP packet to specify the interworking function at a handover destination of the mobile packet terminal.

11. The address resolution communication system as claimed in claim 10, wherein when detecting the handover over the inter-working function, said one mobile packet terminal creates and transmits the IP address of its own mobile packet terminal to a transmission IP address portion and a target IP address portion, and creates and transmits to a transmission physical address portion an ARP request message in which the mobile ID of its own packet terminal is set.

12. The address resolution communication system as claimed in claim 10, wherein when the handover over the inter-working function is detected, the one mobile packet terminal creates and transmits the IP address of its own mobile packet terminal to a transmission IP address portion of a non-group ARP and a target IP address portion, and creates and transmits to a transmission physical address portion an ARP request message in which a mobile ID of its own mobile packet terminal is set.

13. The address resolution communication system as claimed in claim 10, wherein when the handover over the inter-working function is detected, the one mobile packet terminal creates and transmits the IP address of its own mobile packet terminal to a transmission IP address portion of a non-group ARP and a target IP address portion, and creates and transmits to a transmission physical address portion an ARP request message in which a telephone number of its own mobile packet terminal is set.

14. The address resolution method as claimed in claim 10, wherein the inter-working function uses Ethernet as the connectionless network, and when receiving data containing the ARP request message from the one mobile packet terminal, the inter-working function forms the data to an Ethernet frame as a physical layer of the connectionless network and transmits the Ethernet frame to the connectionless network.

15. The address resolution communication system as claimed in claim 10, wherein the inter-working function uses as the connection oriented communication system an IS-95 system which is standardized in EIA (Electronic Industries Association)/TIA (Telecommunication Industry Association), ANSI (American National Standard Institute) and CDG (CDMA Development Group).

* * * * *